United States Patent [19]
Kunst

[11] Patent Number: 6,008,685
[45] Date of Patent: Dec. 28, 1999

[54] SOLID STATE TEMPERATURE MEASUREMENT

[75] Inventor: David J. Kunst, Tuscon, Ariz.

[73] Assignee: Mosaic Design Labs, Inc., Cupertino, Calif.

[21] Appl. No.: 09/047,633

[22] Filed: Mar. 25, 1998

[51] Int. Cl.$^6$ ................................................. H01L 35/00
[52] U.S. Cl. ............................................ 327/512; 327/83
[58] Field of Search .................................. 327/512, 513, 327/83, 138, 139, 140, 262, 378; 326/33, 34; 374/102, 703, 732

[56] References Cited

U.S. PATENT DOCUMENTS

| | | | |
|---|---|---|---|
| 3,764,922 | 10/1973 | Gilbert et al. | 328/162 |
| 4,276,513 | 6/1981 | Johnston et al. | 330/9 |
| 4,429,282 | 1/1984 | Saari | 330/9 |
| 4,539,551 | 9/1985 | Fujita et al. | 340/347 AD |
| 4,600,901 | 7/1986 | Rabaey | 332/11 D |
| 4,633,223 | 12/1986 | Senderowicz | 340/347 |
| 4,827,161 | 5/1989 | Kunitoki et al. | 327/562 |
| 5,195,827 | 3/1993 | Audy et al. | 374/172 |
| 5,461,381 | 10/1995 | Seaberg | 341/143 |
| 5,598,157 | 1/1997 | Kornblum et al. | 341/120 |
| 5,691,720 | 11/1997 | Wang et al. | 341/143 |
| 5,703,589 | 12/1997 | Kalthoff et al. | 341/172 |

OTHER PUBLICATIONS

Van De Plassche, R.J. "A Sigma–Delta Modulator as an A/D Converter," IEEE Trans. on Cir. & Systems, vol. CAS–25, No. 7, Jul., 1978, pp.510–514.

Robert, J., G.C. Temes, V. Valencic, R. Dessoulavy, and P. Deval, "A 16–bit Low–Voltage CMOS A/D Converter," IEEE, J. Solid–State Circuits, vol. SC–22, No. 2, Apr., 1987, pp. 157–163.

*Primary Examiner*—Timothy P. Callahan
*Assistant Examiner*—An T. Luu
*Attorney, Agent, or Firm*—William Ryan

[57] ABSTRACT

In a temperature measuring circuit suitable for implementation on an integrated circuit (IC) a plurality, M, nominally unit value current sources are individually and collectively applied to a sensor such as a diode or transistor. The resulting individual $V_{BE}$ voltages are measured and used to form an average, $V_{BE(AVG)}$, of the individual voltages. The difference $\Delta V_{BE}$ between the voltage, $V_{BE(TOT)}$, resulting from application of all M current sources and $V_{BE(AVG)}$ is used to solve for temperature in a relationship that is independent of the current values used. An error-corrected version of a sigma-delta analog-to-digital converter (ADC) is used to convert the analog measurements into digital signals representative of temperature.

27 Claims, 6 Drawing Sheets

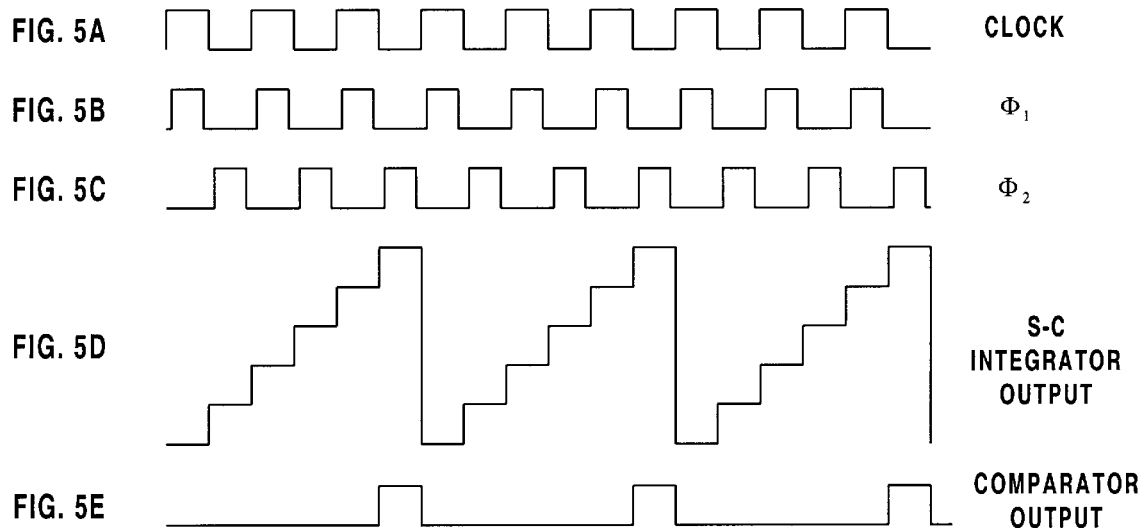
FIG. 5A CLOCK
FIG. 5B Φ₁
FIG. 5C Φ₂
FIG. 5D S-C INTEGRATOR OUTPUT
FIG. 5E COMPARATOR OUTPUT
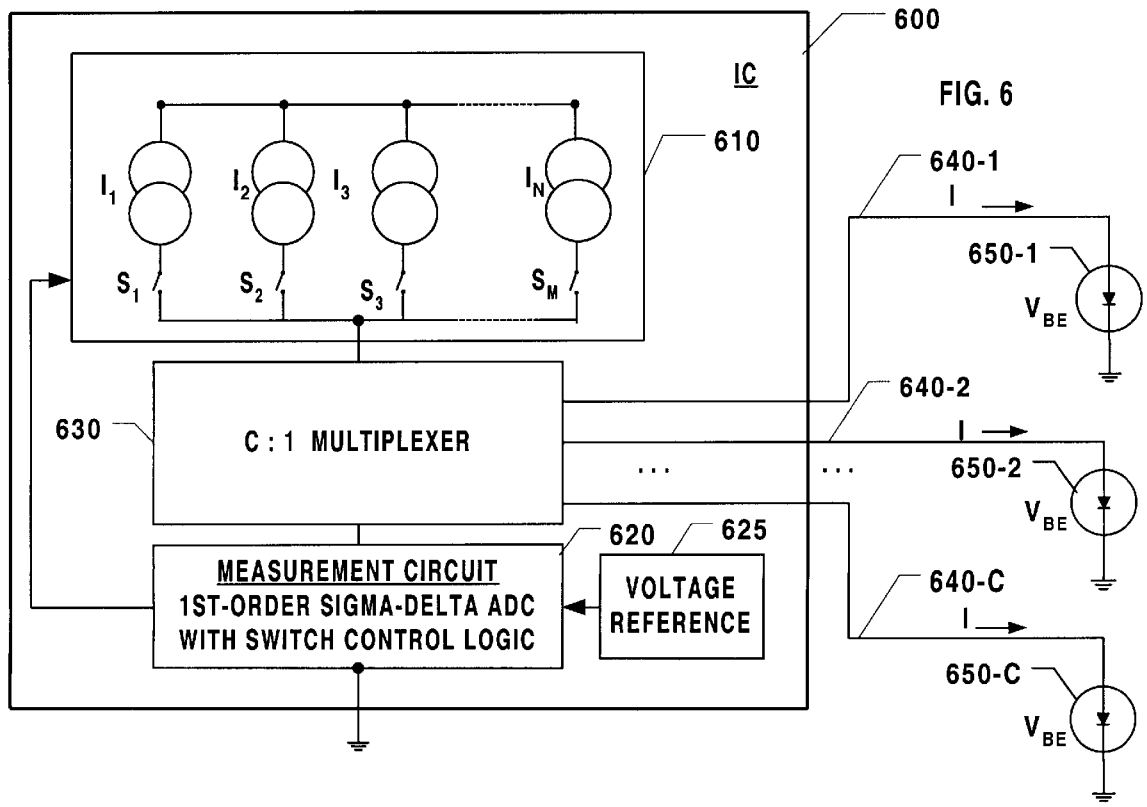
FIG. 6

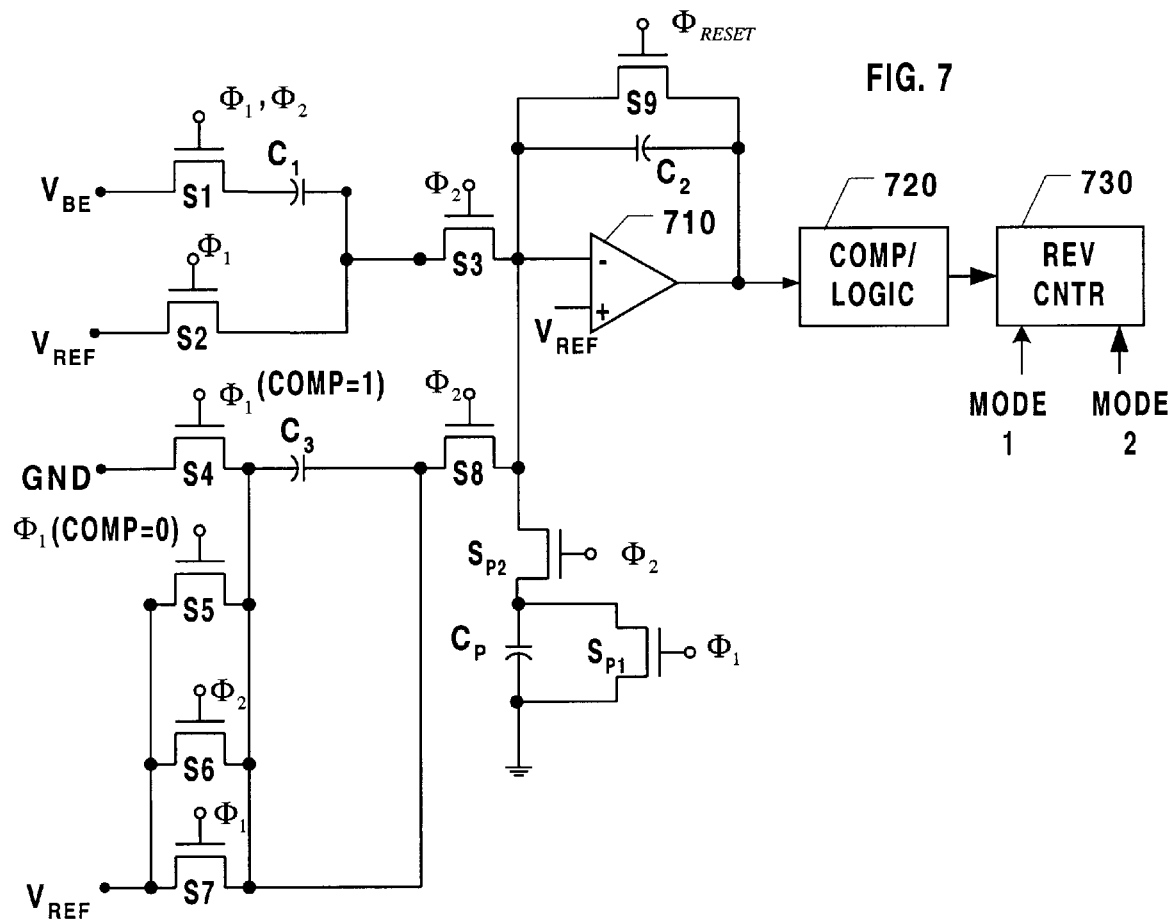
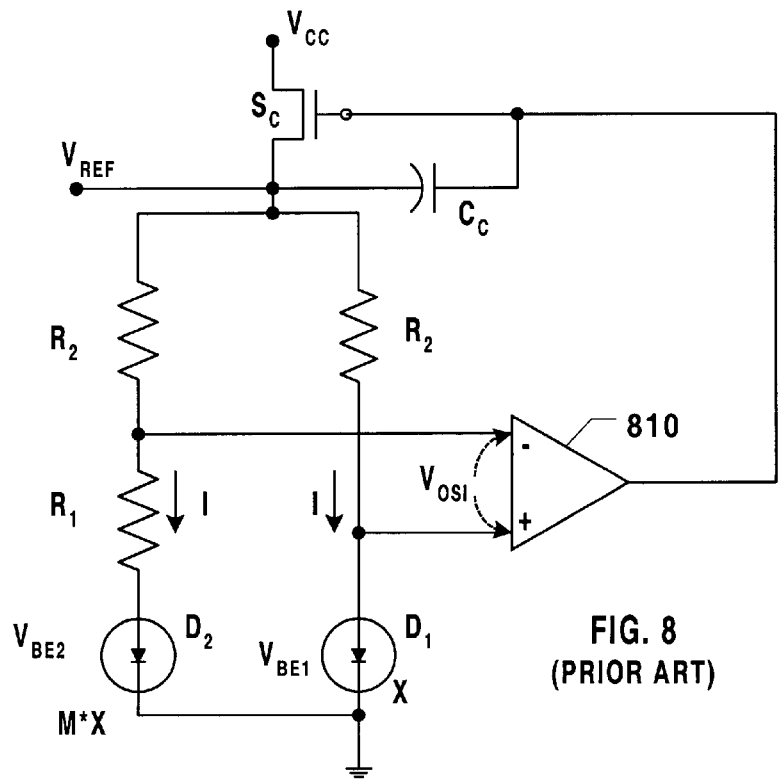
FIG. 7
FIG. 8 (PRIOR ART)

6,008,685

SOLID STATE TEMPERATURE MEASUREMENT

FIELD OF THE INVENTION

The present invention relates to solid state devices and methods, especially as used for measuring temperature. More particularly, the present invention relates to devices, circuits and methods for exciting temperature sensors and for measuring voltages produced by such sensors. Still more particularly, the present invention relates for devices, circuits and methods for converting temperature sensor outputs to accurate digital representations of temperature.

BACKGROUND OF THE INVENTION

Solid-state temperature sensors are widely used to provide reliable temperature measurement for many applications. In fact, silicon sensors often provide superior performance at a much lower cost than resistance-temperature-detectors, thermocouples and thermistors. Silicon-based temperature measurement typically involves an integrated circuit (hereinafter "IC") and a sensor diode as shown in FIG. 1. The IC 100 in FIG. 1 applies current to diode 150 using on-chip current sources 110 and 115 of standard design and corresponding switches S1 and S2 (120 and 125, respectively). Clock and switch control circuit 140 provides alternating clock control signals to alternately close switches S1 and S2 and apply the respective currents to diode 150. Measurement circuit 130 then measures the voltages, $V_{BE}$, appearing across the diode when the currents are applied, which voltage is proportional to temperature. Specifically, switch control circuit 140 is shown generating the alternating sampling signals, $\Phi_1$ and $\Phi_2$. During clock phase 1, $\Phi_1$, switch S1 is closed and the diode is biased by $I_1$ to produce a voltage, $V_{BE1}$. During clock phase 2, $\Phi 2$, switch S2 is closed and the diode is biased by $I_2$ to produce voltage, $V_{BE2}$. The measurement circuit samples and stores the diode voltage during each clock phase.

The measurements are based on a diode's voltage-current relationship, which is governed by the equation $$V_{BE}=V_T*\ln(I_D/I_S) \quad (1)$$

where, $I_D$ is the forward diode current, $I_S$ is the diode reverse-saturation current, $V_{BE}$ is the forward diode voltage, and $V_T$ is the diode's thermal voltage given by $$V_T=K*T/q \quad (2)$$

where, K=Boltzmann's Constant=$1.38066*10^{-23}$J/°K
T=Temperature in degrees Kelvin, °K, and
q=Electron Charge=$1.602*10^{-19}$Coulombs.

It can be shown that the change in voltage measured across a diode, $\Delta V_{BE}$, when the diode is excited with two different currents, $I_1$ and $I_2$, is $$\Delta V_{BE}=V_T*\ln(I_1/I_2) \quad (3)$$

If the currents, $I_1$ and $I_2$, are precisely matched, then $\Delta V_{BE}$ can be used to provide a very stable, well-defined thermometer signal by substituting Equation (2) in Equation (3) and solving Equation (3) for T.

FIG. 1 illustrates a "single-wire" diode temperature measurement system in which only one conducting path connects a single pin of IC 100 and diode 150. The structure of FIG. 1 can, of course, be expanded for use with a plurality N of diodes, each connected to a respective pin on an IC such as 100 in FIG. 1, and each monitoring temperature at a respective off-chip location. A standard N:1 multiplexer is then controlled by the clock and control circuit 140 to connect the measurement circuitry 130 to each of the N diodes in turn.

By way of contrast, FIG. 2 illustrates the use of a transistor 250 to provide a more accurate "two-wire" differential measurement. The IC 200 in FIG. 2 contains an excitation circuit comprising current sources $I_1$ (215), $I_2$ (210), and respective switches S1 (220), and S2 (225), operating under the control of clock and switch control circuit 240, as in FIG. 1. Again, the voltages $V_{BE1}$ and $V_{BE2}$ are sampled and stored when respective currents $I_1$ and $I_2$ are applied. In the circuit of FIG. 2 current flows from the excitation circuit output through pin 245 of the IC 200 and through a wire connection 260 having resistance $R_{WIRE}$ to the emitter of transistor 250. Voltage measurements are made by measurement circuit 240 by way of pin 246 on IC 200. Pin 246, in turn, connects to the emitter of transistor 250 via a separate wire connection 265. Because the current over connection 265 is very low, the IR drop over that wire is likewise low. The use of a separate connection to the emitter 250 avoids possible errors resulting from an IR drop due to the relatively higher applied currents through the sometimes non-negligible resistance of wire 260. In cases where the value for $R_{WIRE}$ is low, however, the wire 265 may be eliminated and a jumper provided across pins 245 and 246 of IC 200. Because connections 247 and wire 265 are options, they are indicated by dashed lines in FIG. 2. The two-wire connection using transistor 250 (which may be a PNP or NPN transistor) to IC 200 also includes the ground sense path 270 connecting the base of transistor 250 to ground pin at IC 200. Because of the transistor connection, the current flowing in the ground sense wire is divided by the β of transistor 250. Multiplexing techniques can be applied to the circuitry of FIG. 2 in the same manner as for the diode monitor arrangement of FIG. 1. Either PNP or NPN sensor transistors can be used in such applications.

If the currents $I_1$ and $I_2$ in the circuits of FIGS. 1 and 2 are precisely in the proportion $I_1=M*I_2$, and the measurement circuit is designed to subtract $V_{BE2}$ from $V_{BE1}$, then the residual signal, $\Delta V_{BE}=V_T*\ln(M)$, provides an accurate measure of temperature. A key to achieving accurate temperature measurement using this technique therefore is the matching of the current sources, $I_1$ and $I_2$. It is generally not possible to exactly match two independent current sources on a chip with any high degree of reproducibility.

Ratio matching in the range of 0.1% to 1.0% can be achieved through the use of very precise design and manufacturing techniques, but many applications require better accuracy. One-time factory calibration is often used to reduce the current source mismatch error, but this approach relies on the use of expensive manufacturing techniques including thin-film laser trimming, so-called zener-zapping, or fuse blowing. These solutions require additional active silicon for implementation, which increases the size and cost of the chip. Furthermore, the extra trim circuitry and testing results in a reduction of product yield and increase in manufacturing cost.

SUMMARY OF THE INVENTION

The limitations of the prior art are overcome and a technical advance is made in accordance with the present invention as described in illustrative embodiments herein. In one such embodiment, a plurality, M, of current sources are individually and collectively applied to a sensor. The resulting individual $V_{BE}$ voltages are measured and used to form an average, $V_{BE(AVG)}$, of the individual voltages.

Advantageously, the difference between the voltage, $V_{BE(TOT)}$, resulting from application of all M current sources and $V_{BE(AVG)}$ is used in forming $\Delta V_{BE}$ as in Equation (3) above. However using the above-mentioned averaging techniques, the ratio of $I_1/I_2$ in Equation (3) is advantageously replaced by the constant M.

In an illustrative embodiment of another aspect of the present invention, an adaptation of the well-known sigma-delta analog-to-digital converter (ADC) is used to convert the analog measurements into digital signals. Using a modified switched capacitor input network advantageously forces top plates of sampling capacitors to a common reference voltage to thereby avoid so-called top-plate switch errors.

Other aspects of the present invention include novel error correction circuitry for use in ADC arrangements used in combination with switched current source and measurement circuitry for measuring differential voltage signals. Other error correction techniques are employed in bandgap voltage reference circuitry such as that used in typical ADC embodiments.

BRIEF DESCRIPTION OF THE DRAWING

The present invention will be understood more fully after a consideration of the following detailed description in connection with the attached drawing wherein:

FIGS. 5A–E show typical waveforms associated with illustrative modulator operation in accordance with embodiments of the present invention.

FIG. 6 shows an illustrative combination circuit embodying aspects of the circuitry of FIGS. 3 and 4 above and a multiplexer used with one or more sensors.

FIG. 7 shows an illustrative analog-to-digital converter error correction circuit for use with embodiments of the present invention.

FIG. 8 shows a well-known bandgap voltage reference.

DETAILED DESCRIPTION

Temperature Measurement

Figure 1:
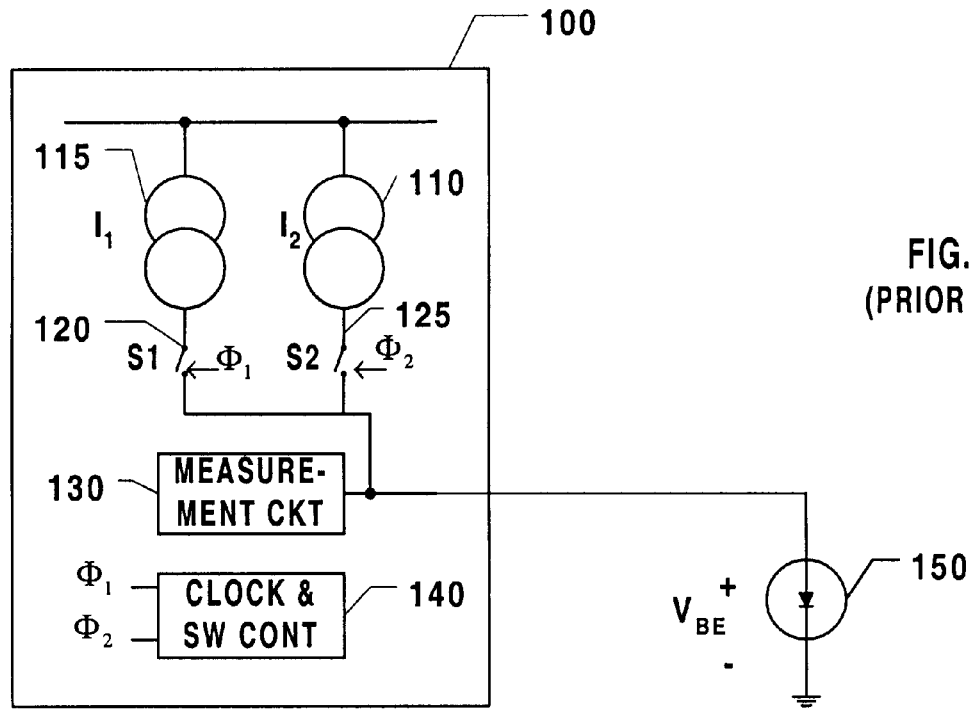
FIG. 1 illustrates a prior art use of an integrated circuit and a diode to measure temperature.
Figure 2:
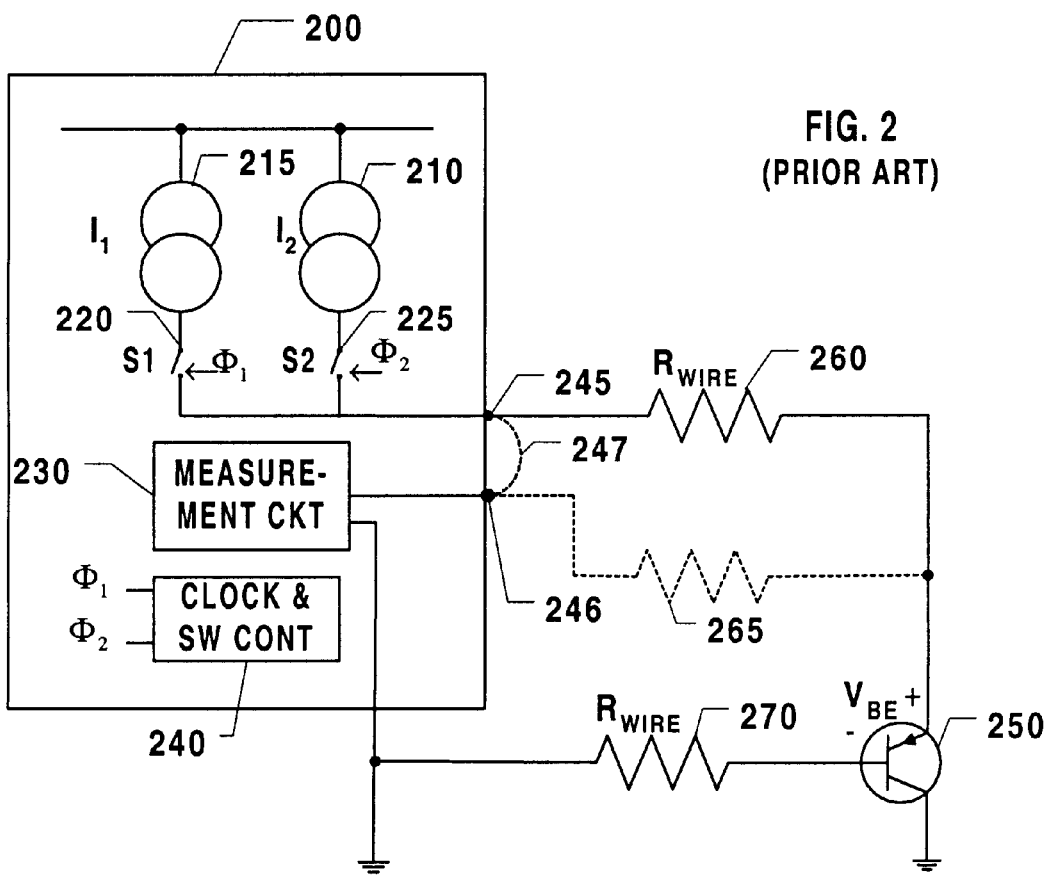
FIG. 2 illustrates another prior art temperature measuring combination using a transistor-integrated circuit diode to measure temperature.
Figure 3:
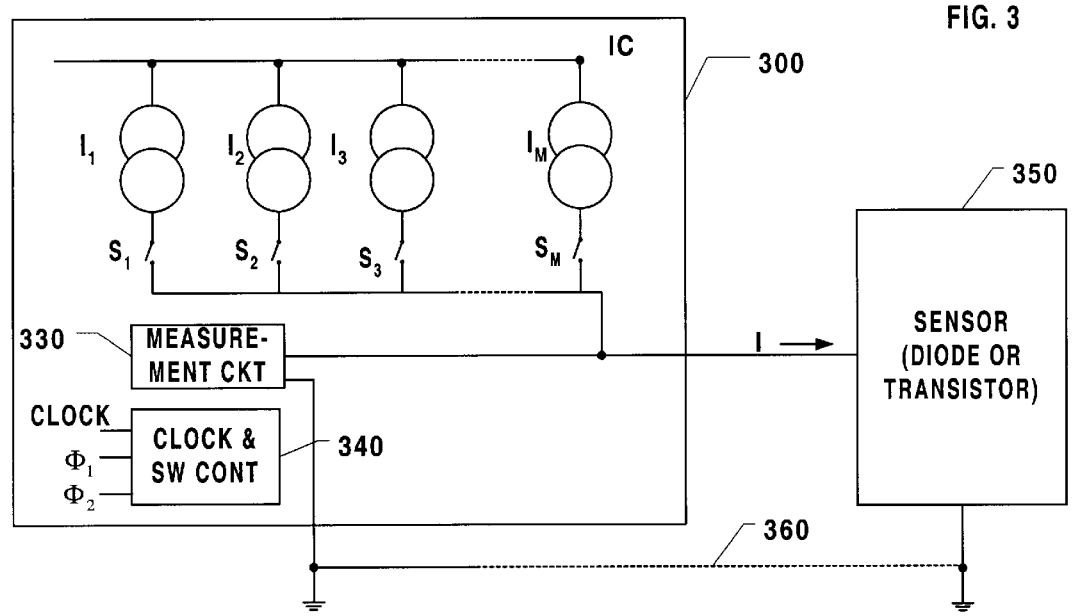
FIG. 3 illustrates a general switched-current-source excitation and measuring circuit used in combination with a sensor in accordance with one aspect of the present invention.

A solution to the problem of current source mismatching is depicted in illustrative embodiment in FIG. 3. Instead of employing the prior art technique of using two current sources (one unit size source and one relatively large size source) to generate $\Delta V_{BE}$, a plurality, M, of unit-size current sources are used. Current sources, $I_1$ to $I_M$, and corresponding switches $S_1$ to $S_M$ operate sequentially under the control of respective control signals from clock and switch control circuit 340, thereby to limit current source mismatch error to an insignificant level. In particular, each current source can be expressed as $I_u+e_j$, where $e_j$ represents a random mismatch error due to process variations and imperfections. A switch control system operating, e.g., under a repetitive M-cycle two-phase clock represented by outputs of clock and switch control circuit 340 is advantageously used to sequentially apply the output of each of the currents sources $I_1, I_2, \ldots, I_M$ to sensor 350. Sensor 350 may again be a diode (as in FIG. 1) or a PNP or NPN transistor (as in FIG. 2). Dashed line 360 is used to represent the additional connection that is associated with use of a transistor rather than a diode.

As each current source is selected and its output applied to sensor 350, the voltage $V_{BE}$ corresponding to the voltage drop across the diode or base-emitter junction of the sensor, as the case may be, is advantageously measured and stored. When all M voltages are measured and stored, the average, $V_{BE(AVG)}$, of the voltage samples is determined. It proves advantageous when making the voltage measurements and determining the average, to also measure and store the diode voltage, $V_{BE(TOT)}$, with all switches closed simultaneously, and then subtract $V_{BE(AVG)}$ from $V_{BE(TOT)}$. Thus, $$V_{BE(AVG)} = V_T * \ln\{I_{AVG}/I_S\} = V_T * \ln[(M*I_u + \Sigma e_j)/(M*I_S)] \quad (4)$$

$$V_{BE(TOT)} = V_T * \ln[(M*I_u + \Sigma e_j)/I_S]. \quad (5)$$

Equations (4) and (5) can be combined, to obtain the desired difference $$\Delta V_{BE} = V_T * \ln(M). \quad (6)$$

Equation (6) is then solved for T after substituting for $V_T$ using Equation (2). The temperature variable, T, is thus found to be in direct proportion to $\Delta V_{BE}$, with the proportionality factor depending only on the constants K and q and the parameter M. Using this approach to generate a signal proportional to temperature permits the designer to achieve a result that is insensitive to process variations and device mismatches, thus creating a circuit design that is robust and portable to many manufacturing contexts and circuit contexts. While a particular circuit arrangement for converting the analog measurement signals to a convenient digital form will be described below, switched current source excitation and measurement circuits based on the illustrative embodiment shown in FIG. 3 may take many and varied forms.

Moreover, the above-described switched current averaging design provides high frequency noise immunity critical in applications such as computers, communications, automotive and industrial control equipment. Significantly, no factory calibration or trimming is required, thereby reducing chip size and manufacturing cost. As in the discussion of the circuits of FIGS. 1 and 2, a single IC can be used to measure temperature at several locations within a system by simply switching the excitation and measurement circuitry through a multiplexer to each of several remote sensors (diodes or transistors). This is shown in FIG. 6, which will be described more completely below.

To better understand the operation of the circuit of FIG. 3 in generating analog signals related to the temperature at one or more sensors such as diode 350, and to provide an introduction to the conversion of these signals to a digital representation proportional to that temperature, it proves useful to consider a particular example with reference to Table 1. In that table, there is referenced in the left hand column cycles of a repetitive clock signal of the general form shown in FIG. 5A and appearing as an output in clock and switch control circuit 340 in FIG. 3. Non-overlapping clock phases $\Phi_1$ and $\Phi_2$ having the form shown in FIGS. 5B and 5C, respectively, are likewise shown as outputs of clock and switch control circuit 340.

The center column in Table 1 shows switches closed during $\Phi_1$ of each clock period, while the right column shows switches closed during $\Phi_2$ of these clock periods. As can be seen, each of the switches $S_1$ through $S_M$ is closed in sequence during $\Phi_2$ of a respective clock cycle, thereby causing corresponding currents $I_1$ through $I_M$ to be applied to sensor 350 in the circuit of FIG. 3. By contrast, all of the switches $S_1$ through $S_M$ are closed during each $\Phi_1$, and all of currents $I_1$ through $I_M$ are applied to sensor 350 during each $\Phi_1$. It proves convenient to refer to the voltages measured by measurement circuit 330 in FIG. 3 during each $\Phi_1$ and $\Phi_2$ as $V_{BE(\Phi 1)}$ and $V_{BE(\Phi 2x)}$, respectively.

TABLE 1

| CLOCK CYCLE | SWITCHES CLOSED DURING $\Phi_1$ | SWITCHES CLOSED DURING $\Phi_2$ |
| --- | --- | --- |
| 1 | $S_1$ through $S_M$ | Only $S_1$ |
| 2 | $S_1$ through $S_M$ | Only $S_2$ |
| 3 | $S_1$ through $S_M$ | Only $S_3$ |
| *** | *** | *** |
| M | $S_1$ through $S_M$ | Only $S_M$ |
| M + 1 | $S_1$ through $S_M$ | Only $S_1$ |
| *** | *** | *** |

Since there are M current sources switched by M switches under the control of a periodic two-phase clock, this sequence repeats until the conversion is complete. It will be noted below in connection with an illustrative temperature-to-digital conversion circuit that the M-clock-cycle sequence of Table 1 is advantageously repeated for $2^{n+1}$ clock cycles to achieve an n-digit representation of $\Delta V_{BE}$, which has been shown to be proportional to temperature. Upon scaling of the proportionality constant in standard fashion, the n-digit representation will report temperature at sensor 350.

Temperature-to-Digital Conversion

As noted above, the voltage signals measured upon application of the various currents by applying the switches in FIG. 3 are analog signals. A sigma-delta ($\Sigma\Delta$) analog-to-digital converter (ADC) is advantageously used to accurately convert these analog voltages to digital values. An illustrative $\Sigma\Delta$ ADC is shown in the circuit arrangement of FIG. 4. In particular, that circuit proves useful in generating digital values for $\Delta V_{BE}$ described above in connection with Equation (6). Though an illustrative $\Sigma\Delta$ ADC is shown in FIG. 4 for measuring $\Delta V_{BE}$, it will be recognized that other ADC arrangements, and other particular $\Sigma\Delta$ ADCs will prove useful in combination with other elements of the present invention.

Figure 4:
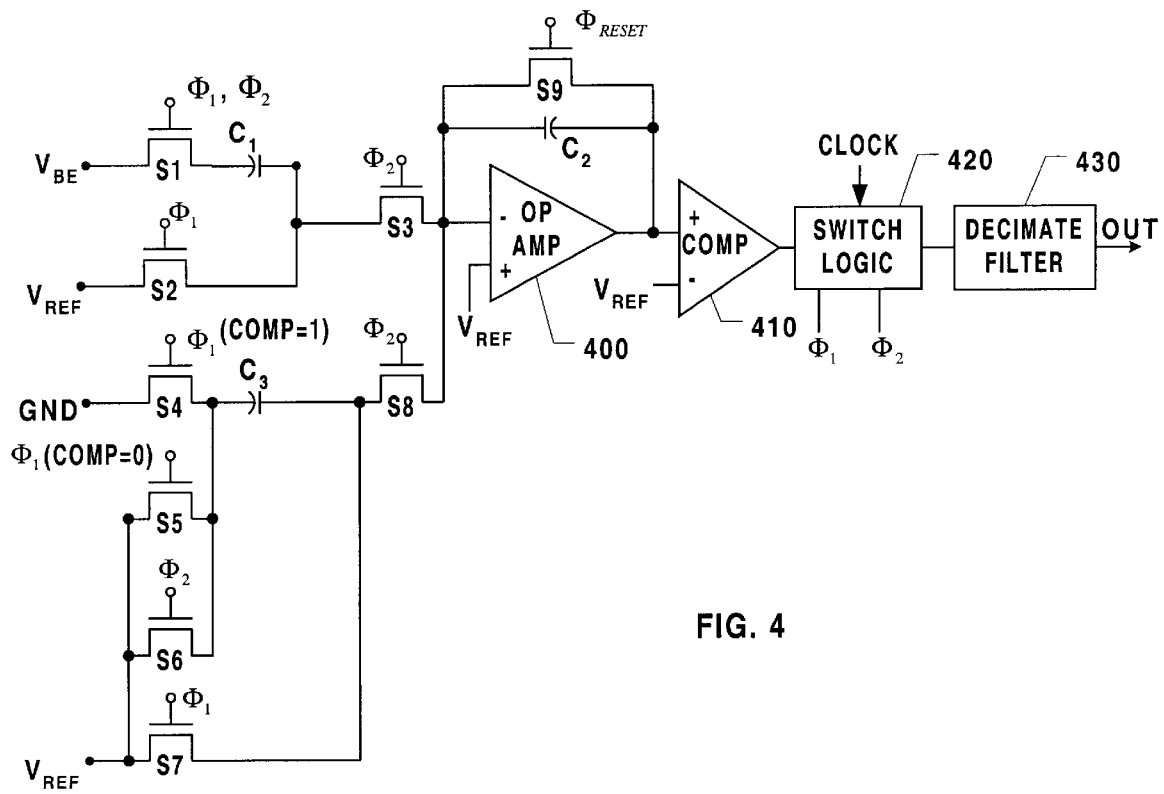
FIG. 4 shows an illustrative sigma-delta analog-to-digital converter (ADC) for use in embodiments of the present invention.

Using the architecture of FIG. 4 power requirements and required device area are modest, thus favoring implementation as part of an IC without imposing stringent processing requirements. For definiteness, the following discussion of the illustrative sigma-delta ADC shown in FIG. 4 is based on analog input signals reflecting voltages appearing at a sensor diode resulting from the application of currents from the switched current source arrangement shown in FIG. 3, with currents applied in accordance with the example of Table 1. As discussed above the sensor 350 may be a transistor in appropriate cases.

The illustrative circuit of FIG. 4 can be seen to include four main sections: a switched-capacitor (S-C) integrator including an operational amplifier (op amp) 400, a comparator 410, switch control logic 420 and a 1-bit digital-to-analog converter (DAC). The 1-bit DAC is realized through the combination of switches $S_4$–$S_8$ and $C_3$ connected in the circuit in the manner shown in FIG. 4. Such 1-bit DACs are common in sigma-delta ADCs.

Since the signals representing temperature usually change slowly, a first-order modulator is used to convert the input voltages into a stream of pulses having a count that is proportional to temperature at sensors such as 350 in FIG. 3. Counter/decimator 430 receives, decimates and filters the pulse stream output from comparator 410 via switch logic circuit 420 to record the digital representation of the differential voltage $\Delta V_{BE}$. Such decimating and filtering are well-known in the art for use with $\Sigma\Delta$ ADC's of the general type shown in FIG. 4 and will not be detailed further in the present description. Typical use of such decimation filtering operations in conjunction with $\Sigma\Delta$ ADCs and related circuits is illustrated, e.g., in U.S. Pat. Nos. 4,972,379; 4,972,436; 5,051,981; 5,157,395; and 5,646,621, though none of these specific designs is uniquely related to the present invention and embodiments thereof.

The S-C integrator comprises switches $S_1$ through $S_3$, $S_9$, and capacitors $C_1$ and $C_2$. These switches and capacitors are of standard design and will typically be implemented with building block elements characteristic of the IC device design. The S-C integrator operates on a clock signal having the illustrative form shown in FIG. 5A, which clock signal is shown as an input to switch logic circuit 420 in FIG. 4. This clock signal has two non-overlapping clock phases, $\Phi_1$ and $\Phi_2$, shown in FIGS. 5B and 5C, respectively. It proves convenient to derive two additional clock signals (not shown) from $\Phi_1$, one being 1 only when $\Phi_1$ and the output of comparator are 1, and the other being 1 only when $\Phi_1$ is 1 and the output of comparator 410 is 0. Reset signal $\Phi_{RESET}$ is applied to close switch $S_9$ across $C_2$ at the beginning of an entirely new measurement cycle, the effect being to initially bias op amp 400 to an operating point which will avoid saturation of the op amp during its operation.

In one specific embodiment, the complete temperature-to-digital conversion employs $2^{n+1}$ cycles of the clock signal shown in FIG. 5A, where n is the number of desired digital output (result) bits. During each $\Phi_1$ portion of the clock cycle, shown in FIG. 5B, $C_1$ samples $V_{BE(\Phi 1)}$, and during clock $\Phi_2$, $C_1$ samples $V_{BE(\Phi 2)}$, with $(V_{BE(\Phi 1)} > V_{BE(\Phi 2)})$. As was discussed above in connection with Table 1, $V_{BE(\Phi 1)}$ and $V_{BE(\Phi 2)}$ correspond to signals generated as the switched current sources are applied (in illustrative fashion as indicated in Table 1) to sensor 350 in FIG. 3. For the example described above, these illustrative signals correspond to $V_{BE(TOT)}$ (during $\Phi_1$) and $V_{BE(AVG)}$ (during $\Phi_2$ averaged over the measurement cycle), respectively. Of course the arrangement of FIG. 4 can be applied to ADC operations generally. For example, these techniques can be used not only for temperature measurement, but in providing a digital output in response to applied differential voltages of many kinds. When one of the inputs is held at any fixed potential, subject to $V_{IN(\Phi 1)} > V_{IN(\Phi 2)}$, the circuit of FIG. 4 functions as an accurate digital differential voltmeter.

In typical operation, the cycle of signals generated by the application of current sequences shown in Table 1 will be repeated many times for each n-digit output from decimation filter 430. Different values for the parameters M and n, as well as the particular design chosen for filter 430 will generally affect the number of clock cycles for each new output. Some detailed designs permit a result after as little as M periods. When the switched current excitation arrangement and voltage measurement circuitry are multiplexed among C sensors 640-1 through 640-C as shown in FIG. 6, the period between available output readings for a particular sensor will be increased accordingly.

Returning to the operation of the modulator of FIG. 4, it is seen that this arrangement operates, in one aspect, as a closed-loop negative feedback system seeking to maintain an average voltage of $V_{ref}$ at the output of the integrator (output of operational amplifier 400). During $\Phi_1$ of each clock cycle, capacitor $C_1$ samples $V_{BE(\Phi 1)}$ on its bottom plate (via $S_1$) and $V_{ref}$ on its top plate (via $S_2$). Meanwhile, $C_3$ samples either ground via $S_4$ (if comparator=1) or $V_{ref}$ via $S_5$ (if comparator=0) on its bottom plate, and $V_{ref}$ on its top plate via $S_7$. During $\Phi_2$ of each clock cycle, $C_1$ and $C_3$ sample $V_{BE(\Phi 2)}$ and $V_{ref}$ on their respective bottom plates while their top plates are forced to $V_{ref}$ by the virtual connection between the op amp's input terminals. It will be understood that the input $V_{BE}$ represents the output from the switched current source arrangement of FIG. 3, with values presented at that input during respective clock phases $\Phi_1$ and $\Phi_2$ illustratively reflecting $V_{BE(TOT)}$ (during $\Phi_1$) and the individual VBEs, respectively. The averaging effect of the modulator operation produces from the individual $V_{BE}$ arising from the application of individual current sources during their respective periods (as provided in Table 1, for example) the equivalent of $V_{BE(AVG)}$ being applied during the entire modulator cycle.

This architecture does not suffer from "top-plate" switching errors, which plague many designs. This is so because the voltage on the top plate of both sampling capacitors, $C_1$ and $C_3$, is always forced to the same potential, $V_{ref}$, throughout the conversion.

If $V_{BE(\Phi 1)}$ is greater than $V_{BE(\Phi 2)}$, then during $\Phi_2$, the output of the integrator will increase as a result of the charge transfer from $C_1$ to $C_2$. If the bottom plate of $C_3$ sampled 0V during $\Phi_1$, then during $\Phi_2$, the charge transfer from $C_3$ to $C_2$ will produce a net decrease at the integrator's output. If the bottom plate of $C_3$ sampled $V_{ref}$ during $\Phi_1$, then no charge will be transferred from $C_3$ to $C_2$ during $\Phi_2$, and the integrator's output will increase based only on the transfer of charge from $C_1$ to $C_2$.

A staircase shape waveform will typically appear at the output of integrator 400, as shown in FIG. 5D. This output increments upward on each clock cycle until it crosses the comparator input threshold, $V_{ref}$, giving rise to the illustrative pulse shown in FIG. 5E. The integrator output is then offset downward due to the sampling of $-V_{ref}$ at $C_3$ during $\Phi_1$ when the comparator output is 1 (high).

If the output is initialized at $V_{ref}$, then it can be shown (e.g., through charge conservation and superposition theory) that at the end of $2^{n+1}$ clock cycles the output of the integrator is $$V_{OUT}=V_{ref}+2^{n+1}*\Delta V_{BE}*C_1/C_2-N*V_{ref}*C_3/C_2 \quad (7)$$

where,
N=Number of pulses (clock cycles) during which the comparator output is high (comp=1);
n=Number of required digital output (result) bits;
$V_{REF}$=Reference voltage for ADC;
$C_1$=Input voltage sampling capacitor;
$C_3$=$V_{ref}$ sampling capacitor (or 1-bit DAC).
Equation (7) can be solved for N $$N=2^{n+1}*(\Delta V_{BE}/V_{REF})*C_1/C_3+e \quad (8)$$

where, $+1<e<-1$, is the quantization error or noise of the ADC. Although $C_2$ does not appear in Equation (8), it controls the output voltage range of the op amp. The value of $C_2$ is advantageously chosen to bias the output of op-amp 400 within its linear region. A typical application of a temperature measurement system might require a 10-bit result, so $2^{11}$ or 2048 clock cycles would typically be required for such a conversion.

The circuit in FIG. 6 combines the diode excitation circuit of FIG. 3, shown as 610, with the example ADC of FIG. 4, shown as 620, to provide a single IC chip solution to meet many temperature measurement requirements. Also presented in the circuit of FIG. 6 is a voltage reference 625 for providing the $V_{REF}$ voltage used in measurement circuit 620. More will be said below about desirable implementations for voltage reference circuit 625. The addition of C:1 multiplexer 630 in FIG. 6 provide measurements for voltages generated at each of diodes 640-i, i=1,2, . . . , C, when current sources are applied in the illustrative manner shown in Table 1. It again proves convenient to use a clock having two non-overlapping phases in the manner of FIGS. 5B and 5C to control switches $S_1, \ldots, S_M$.

For the multiplexing case (i.e., where C>1), the process of applying currents in the manner of Table 1 and analog-to-digital conversion with circuit 620 is repeated for each of the C diodes shown in FIG. 6, thereby to generate C results $N_j$,j=1,2, . . . , C, each proportional to the temperature of a respective diode 650-j. In one embodiment using such multiplexing techniques and circuits, the multiplexer will be on the same IC as the excitation and measuring circuitry. This would typically involve a separate excitation/input voltage pin (such as 245 in FIG. 2) on the IC for each temperature (or voltage) to be measured. (Of course an extra input pin can be used for transistor sensors.) In an alternative arrangement, the IC continues to use but a single pin, even when C different inputs are being measured. In such cases, an external multiplexer is used to sequentially apply the excitation signals from the IC to the sensors, and the $V_{BE}$ signals from the sensors to the measurement circuitry on the IC. As always, a second pin may be required when using a transistor sensor.

It will be recognized that the circuitry of FIGS. 4 and 6 as described above, provides direct temperature-to-digital conversion with simple low-cost building blocks and standard processing techniques. The design proves to be robust and portable, in part because of its tolerance to IC process variations and imperfections. S-C integrator arrangements illustrated above are insensitive to stray capacitance and switching related errors, e.g., clock feedthrough and charge injection. The "top-plate" switching errors found in many S-C integrators is advantageously avoided in designs based on the above-described principles. Because sigma-delta designs based on the above principles provide averaging such designs will be found to be immune to high frequency noise found in many application environments, including computers, cellular phones, automobiles, etc. As noted in connection with the switched-current source elements described earlier, those skilled in the art will find that factory calibration and trimming can readily be avoided using the present design principles and embodiments. Avoiding such additional processing and structures helps reduce IC chip size and manufacturing cost.

Analog-to-Digital Converter Error Correction

While the analog-to digital circuits described above have high reliability and accuracy suitable for many applications, certain errors common to all sampling systems may warrant further treatment in some cases. For example, switching errors can occur due to charge injection and clock feedthrough in the S-C integrator of FIG. 4. These switching errors can usually be remedied by using non-overlapping clocks to minimize clock feedthrough errors, and by using sufficiently slow fall times on clock edges to reduce charge injection errors.

So-called "offset errors" related to the input offset voltage, $V_{OSI}$, of the integrator op amp 400 in FIG. 4 are also of concern. See, for example, Horowitz, P and W. Hill, The Art of Electronics, $2^{nd}$ Ed., Cambridge Univ. Press, 1989, especially Chap. 4 Feedback and Operational Amplifiers. $V_{OSI}$ errors typically arise from signal path device mismatches inside an op amp caused by imperfections in the manufacturing process. These errors can be calibrated by using the well-known trimming techniques noted above. However, use of trimming and related solutions usually increases complexity and cost of manufacturing IC products, and does not eliminate errors resulting from normal variations in temperature, power supply voltage or common-mode input voltage.

In accordance with another aspect of the present invention, therefore, low frequency offset related errors and noise are substantially eliminated in the analog-to-digital (ADC) architecture presented above with minimal impact on the chip size or power consumption. This result will obtain in the specific use of the ADC to measure temperature, but also more generally in application of ADCs for measuring voltage i.e., with $\Delta V_{BE}$ replaced with a general input voltage $V_{IN}$.

Two measurement periods are advantageously used to eliminate low frequency errors in accordance with this aspect of the present invention. The first period provides error measurement and the second period provides signal measurement. For temperature measurement applications, the operation of the modulator will follow the detailed description given above in connection with FIGS. 3–6, except that during the error measurement period, $V_{BE}$ is the same during both $\Phi_1$ and $\Phi_2$. This is conveniently accomplished by selecting one of the current sources in the illustrative switched current excitation circuitry of FIGS. 3 and 6 to bias the sensor diode throughout the entire error measurement period, instead of cycling and sequencing through the switches. The selection is accomplished with straightforward logic circuitry appropriate to the logical building blocks used in designing and manufacturing the IC on which correction is to be accomplished. Such logic circuitry is well-known in the art and will not be detailed here.

In error measurement periods for more general voltage measurement applications, the bottom plate of $C_1$ in the illustrative circuit of FIG. 4 is connected to any stable reference point (e.g. ground or $V_{ref}$) during both $\Phi_1$ and $\Phi_2$.

Op amps can have either positive or negative $V_{OSI}$ errors. Thus, in order to maintain negative feedback in the modulator loop circuits such as that of FIG. 4, a small positive input voltage $\geq V_{OSI}$ (referred to the input) is advantageously injected. This new input signal is quantized by the ADC of the circuit of FIG. 4 during both the error measurement and signal measurement periods, and the system parameters are chosen to ensure that the modulator does not saturate.

These above-described techniques are readily demonstrated in connection with the illustrative circuit of FIG. 7. There, switches $S_{P1}$ and $S_{P2}$ and capacitor $C_p$ are added to the S-C integrator of FIG. 4. The integrator output will now experience an incremental positive step during each clock cycle given by $$\Delta V_{OUT} = +V_{ref} * C_P/C_2 \qquad (9)$$

The value of $C_P$ is chosen such that $$V_{ref} * C_P/C_2 \geq V_{error} * C_1/C_2 \qquad (10)$$

where, $V_{error}$ represents the net input referred error due to $V_{OSI}$ and switching errors. Now, during the error measurement period, the modulator will produce a count $$N_{EM} = N_P + N_e \qquad (11)$$

where, $$N_P = 2^{n+1} * (V_{ref}/V_{ref}) * C_P/C_3 = 2^{n+1} * C_P/C_3 \qquad (12)$$

and $$N_e = 2^{n+1} * (V_{error}/V_{ref}) * C_1/C_3 \qquad (13)$$

During the signal measurement period, the modulator will produce a count $$N_{SM} = N_{VIN} + N_P + N_e \qquad (14)$$

where, $N_{VIN}$ is the number of counts proportional to the input signal. In equation (14), $N_{VIN}$ and $N_P$ are always positive, while $N_e$ could be either positive or negative. The net result, $N_T$, which is calculated by subtracting $N_{EM}$ from $N_{SM}$ $$N_T = N_{SM} - N_{EM} = (N_{VIN} + N_P + N_e) - (N_P + N_e) = N_{VIN} \qquad (15)$$

is exactly proportional to the input and all low frequency errors have been eliminated. The subtraction function can be easily implemented in silicon by using an up-down counter or by using an up counter and two's complement addition.

One illustrative arrangement based on an up-down counter is shown in FIG. 7 where the comparator, clocking and logic circuitry described above in connection with FIG. 4 is represented by block 720. Likewise, the operative function of decimator 430 in FIG. 4 for purposes of understanding the illustrative error-correcting functionality is represented by reversible (up-down) counter 730. Counter 730 is arranged to receive pulses output from the comparator/logic circuitry 720 reflective of the several voltages appearing at the output of op-amp 710 and to register these as counts. In the zero-differential-input error measurement mode (mode 1 in FIG. 7), the counts that appear are those reflective of the $V_{OSI}$ error and the injected small positive voltage at the input of the op-amp. Because the injected voltage is positive and of magnitude greater than that of $V_{OSI}$, the count at reversible counter 730 is illustratively decremented during the error measurement mode (mode 1). Then, when the signal measurement mode (mode 2 in FIG. 7) is operative, the always-positive error introduced by injecting the small positive voltage (added with the smaller-magnitude, possibly negative $V_{OSI}$) is effectively canceled by having the mode 2 signals (which include these error signals) counted in the opposite direction, i.e., incremented. The order of the two kinds of measurements (errors only and signal with errors) corresponding to mode 1 and mode 2 above is not important; errors can be measured first, or last.

The errors introduced by $V_{OSI}$ and small positive voltage injection do not usually change over short time intervals. Accordingly, error measurements need not be performed for each overall voltage measurement cycle. Rather, once an error count is determined, it can be stored for use over many full input signal measurement intervals. The frequency of error measurement intervals can be selected based on environmental conditions or particular applications. Though the ratio of input signal measurements to error measurements can be quite large, a simple choice, is to have one error count for each input signal count.

This error correction arrangement provides tolerance to process variations and imperfections thereby making the design robust and portable. Moreover, the design can be implemented with simple, standard building block components, thereby reducing development time and manufacturing cost. Typical silicon implementations of the described error-correction circuitry occupy minimal area and consume very little power, thus making it ideal for portable and battery powered applications. Because the above described sigma-delta design inherently provides averaging, this circuit proves highly immune to high frequency noise commonly found in computers, cellular phones, automobiles, etc.

The described error correction scheme removes substantially all low-frequency errors caused by temperature variations, power supply changes and S-C integrator op amp 1/f noise. As for other circuits described above, the error correction circuit features require no one-time factory calibration or trimming.

Self-Calibrated Bandgap Voltage Reference

All ADCs, and many other applications, require a stable voltage reference in order to make accurate measurements or otherwise perform within prescribed constraints. Preferably the voltage reference should provide such an accurate and stable output while consuming minimal power and operating with the lowest possible power supply voltage. One class of circuits that has found widespread use for these purposes is the so-called bandgap voltage reference generator.

The circuit shown in FIG. 8 is a bandgap voltage reference well-known in the prior art. The op amp 810, resistors $R_1$ and $R_2$, and diodes $D_1$ and $D_2$ are configured to generate an output voltage $$V_{ref} = V_{BE1} + \Delta V_{BE} * R_2/R_1 + V_{osi} * R_2/R_1. \tag{16}$$

where, $\Delta V_{BE} = V_T * \ln(M)$, is produced by forcing equal currents into the diodes $D_1$ and $D_2$, whose areas are ratioed by M, i.e., the areas of $D_2$ and $D_1$ are in the ratio M:1. Typical values for the variables in equation (16) are $V_{ref}=1.2V$, $V_{BE1}=0.6V$, $\Delta V_{BE}=60mV$, and $R_2/R_1=10$, This circuit amplifies $V_{OSI}$ variations appearing across the op-amp 810 by a factor of 10 (referred to the output), which adversely effects the performance of the system. One-time factory calibration or trimming have been used in prior art circuits to combat such $V_{OSI}$ induced errors, but this approach suffers from the same shortcomings described above.

Figure 9:
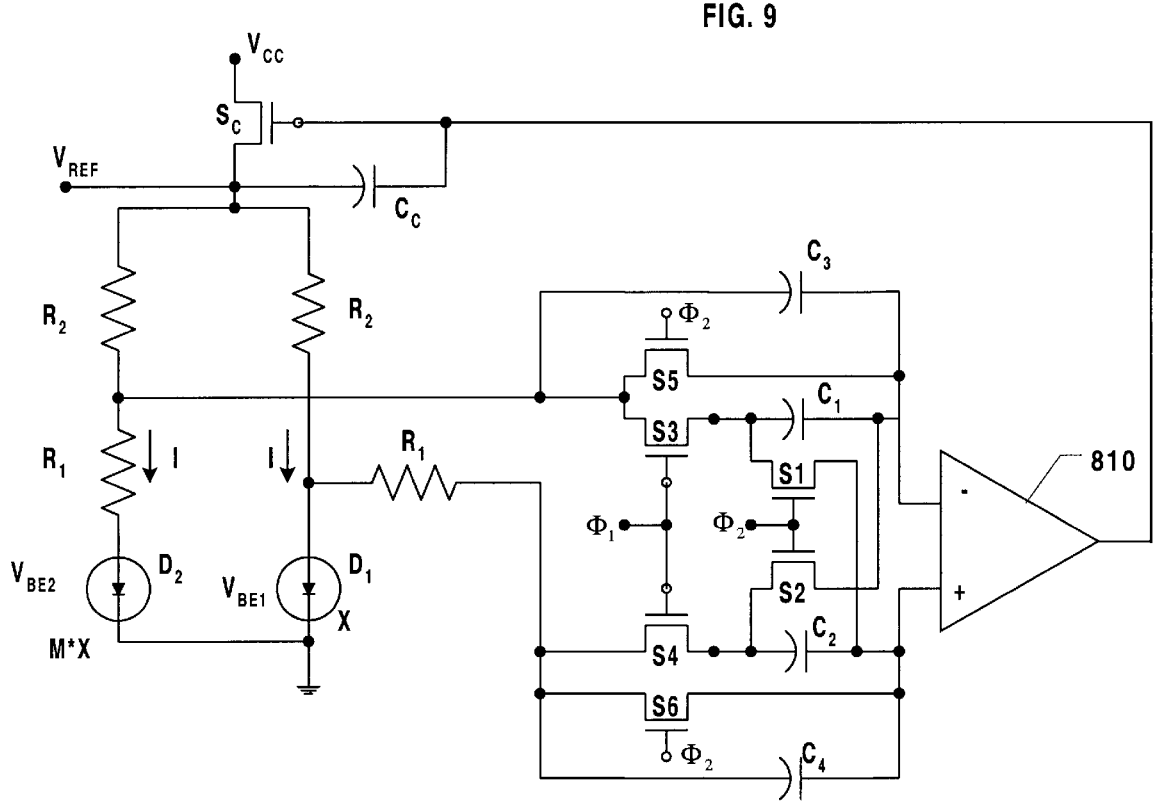
FIG. 9 shows an illustrative embodiment of a self-calibrating bandgap voltage reference in accordance with aspects of the present invention.
Figure 10A:
FIGS. 10A and 10B illustrate typical waveforms of control signals used in respective modes of operation of the circuit of FIG. 9.
Figure 10B:

The circuit shown in FIG. 9 provides a voltage reference solution for sampled data systems that avoid prior art limitations. A new auto-zero circuit is added between op amp 810 and the bandgap diodes and resistors of FIG. 8 to periodically null the op amp's $V_{OSI}$ while functioning in an "auto-zero" mode. FIGS. 10A and 10B illustrate waveforms used for circuit operation during both normal mode and the auto-zero mode. In particular, pulses 950 and 951 in FIG. 10B are auto-zero pulses used during the auto-zero mode of operation.

Capacitors $C_1$–$C_4$ and switches S1–S6 effectively sample $V_{OSI}$ during auto-zero mode, $\Phi_2$, and redistribute the charge to cancel the error during normal mode, $\Phi_1$. The refresh rate for the capacitors depends on the leakage currents in the switches and size of the capacitors. For 1 pF capacitors and minimal geometry switches, the circuit will typically be refreshed at least once per millisecond in order to minimize droop on the capacitors and reduce the common-mode voltage variation at the input of the op amp.

Figure 11:
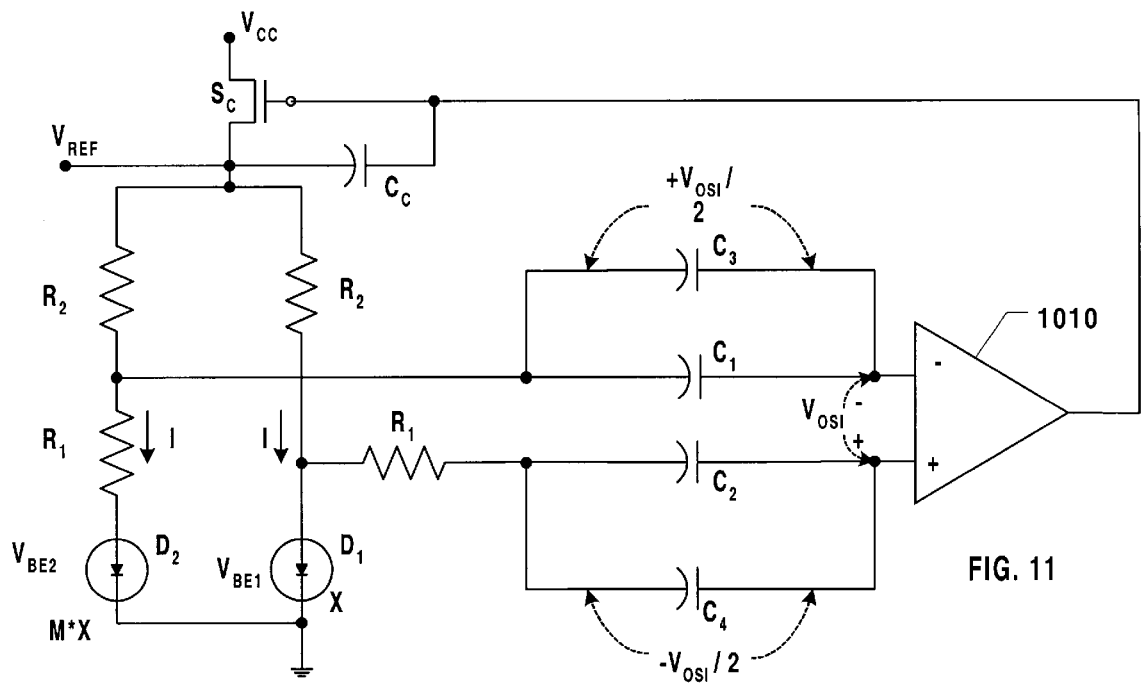
FIG. 11 shows a circuit representation illustrating a first mode of operation of the circuit of FIG.9.
Figure 12:
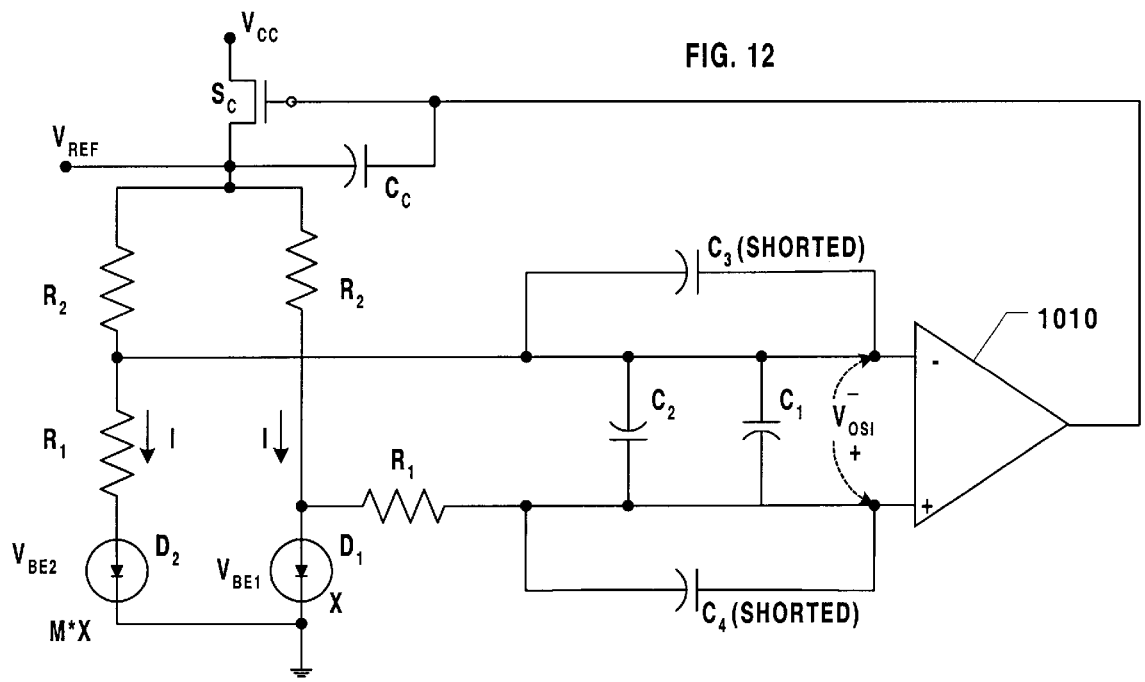
FIG. 12 shows a circuit representation illustrating a second mode of operation of the circuit of FIG. 9.

FIGS. 11 and 12 show equivalent circuits for the operation of the improved bandgap reference circuit of FIG. 9 while operating in the normal and auto-zero modes, respectively. In FIG. 11 charge is shown being redistributed between $C_1$ and $C_3$, and between $C_2$ and $C_4$. (All of capacitors $C_1$–$C_4$ are taken as equal in value.) The voltage of $C_1$ in parallel with $C_3$ and $C_2$ in parallel with $C_4$ is seen to reach $V_{OSI}$ with the indicated polarities in normal mode operation. In the equivalent circuit of FIG. 12, capacitors $C_3$ and $C_4$ are shown as shorted while operating in the auto-zero mode, while capacitors $C_1$ and $C_2$ achieve the charge that is re-distributed in the next period of normal mode operation.

Use of the approach to generate a bandgap voltage reference shown in FIGS. 9–12, in common with other new circuit arrangements described above include insensitivity to process variations and device mismatches, thus contributing to circuit robustness and portability to other particular applications. This switched-capacitor auto-zero technique provides low frequency noise immunity, so the design is insensitive the temperature fluctuations, power supply variations and electronic noise present in applications such as computers, communications, automotive electronics and industrial control. Again, no factory calibration or trimming is required, so IC chip size requirements and manufacturing cost are reduced.

While each of the novel individual circuits described herein have proven especially adapted for use together, those skilled in the art will recognize applications for the inventive contributions separate from other circuits described herein. Thus, the analog measurement techniques and circuits based on a plurality M of switched current sources exciting a sensor will find application independent of any particular analog-to-digital conversion technique. Likewise the disclosed sigma-delta ADC architecture and its error correction features will find application separately in many applications. Finally, the improved bandgap voltage reference will find application in myriad applications in analog voltage measurements, analog-to-digital conversion and otherwise.

No particular IC chip processing techniques are required to apply the above inventive teachings, nor are any particular component or parameter values required. Those skilled in the art will recognize and include a range of component and parameter values in applying the inventive teachings presented to a variety of combinations and applications.

What is claimed is:

1. A temperature measurement system comprising

M>1 current sources having respective current outputs $I_j$, j=1,2, . . . , M, where each $I_j=I_u+e_j$, $I_u$ being a fixed-valued current and $e_j$ an error current representing a deviation from said $I_u$, means for selectively applying $I_j$ for at least one value of j to C≧1 sensors, means for measuring a voltage, $V_{BE}$, at each of said sensors for each application of said currents, and means for determining for each of said sensors a value, $\Delta V_{BE}$, representing the difference between the voltage $V_{BE(TOT)}$ for $V_{BE}$ when the sum of all $I_j$ is selectively applied to each of said sensors and the voltage $V_{BE(AVG)}$ equal to the average for $V_{BE}$ resulting from the application to said each of said sensors of each $I_j$ individually.

2. The system of claim 1 further comprising means for generating a signal proportional to temperature at each of said sensors from the value of $\Delta V_{BE}$ determined for each respective sensor.

3. The system of claim 2 wherein said means for generating a signal proportional to temperature comprises means for generating a signal representing $T=[q*\Delta V_{BE}]/[K*\ln(M)]$, where q is the charge of an electron and K is Boltzmann's constant.

4. The system of claim 1, wherein the number of said sensors is C=1, and said means for selectively applying comprises means for applying each of said $I_j$ individually in sequence to said sensor and for separately applying all of said $I_j$ to said sensor at the same time.

5. The system of claim 4 wherein said sensor is a diode.

6. The system of claim 4 wherein said sensor is a transistor.

7. The system of claim 1 wherein C>1, and wherein said means for selectively applying $I_j$ comprises a multiplexer for selectively applying said $I_j$ to each of a plurality of sensors.

8. The system of claim 1 wherein at least one of said sensors is a diode.

9. The system of claim 1 wherein at least one of said sensors is a transistor.

10. The system of claim 1 wherein said means for determining is an analog-to-digital converter (ADC) having first and second input analog voltages, $V_{BE\Phi1}$ and $V_{BE\Phi2}$, respectively, and a source of reference voltage, $V_{REF}$.

11. The system of claim 10, wherein said voltage reference comprises a bandgap voltage reference.

12. The system of claim 11, wherein said bandgap voltage reference comprises
   a resistor-diode reference network,
   an operational amplifier having an input offset voltage, $V_{OSI}$,
   a switched capacitor network operating alternately in a normal mode and an auto-zero mode, said switched capacitor network storing said $V_{OSI}$ during said auto-zero mode, and said switched capacitor network applying said $V_{OSI}$ to cancel said $V_{OSI}$ at said input of said operational amplifier during said normal mode.

13. The system of claim 10, wherein said ADC is a sigma delta ADC comprising
   an input sampling circuit for sampling $V_{BE\Phi1}$ and $V_{BE\Phi2}$ during alternate clock phases, $V_{BE\Phi1}$ being a voltage across one of said sensors when all of said $I_j$ are applied to said sensor, $V_{BE\Phi2}$ being a voltage across one of said sensors when one of said $I_j$ is applied to said sensor,
   an integrator including an operational amplifier (op-amp) having first and second input terminals and an output terminal, said op-amp receiving input signals from said input sampling circuit on said first input terminal and a reference voltage on said second input terminal, said integrator further comprising a capacitor connected from the output terminal of said op-amp to said first input terminal,
   a comparator for generating an output signal when the output of said op-amp differs from a reference voltage by a predetermined amount, and
   a decimator for forming a count based on said output signals from said comparator.

14. The system of claim 13, wherein said op-amp is characterized by an input offset voltage, $V_{OSI}$, and said ADC further comprises error correcting means operating in a first mode to sample said $V_{OSI}$, and operating in a second mode for biasing said op-amp in such amount as to cancel said $V_{OSI}$ in the output of said ADC while measuring said first and second input signals.

15. The system of claim 14, wherein said error correcting means comprises means for adding a small positive voltage as an input to said op-amp, said small positive voltage being larger in magnitude than said $V_{OSI}$.

16. The system of claim 15, wherein said means for adding comprises a capacitor selectively connected between said first terminal of said op-amp and ground.

17. The system of claim 15, wherein $V_{BE\Phi1}=V_{BE\Phi2}$ when said ADC is operating in said first mode, and said decimator comprises a reversible counter operable when said ADC is operating in said first mode to register a decremented count based on the signed sum of said $V_{OSI}$ and said added small positive voltage, and operable when said ADC is operating in said second mode to register an incremented count based on said analog input signals, said $V_{OSI}$ and said added small positive voltage, said ADC operating in said second mode for at least one measurement cycle for each cycle of operation in said first mode.

18. The system of claim 15, wherein said decimator comprises a first counter for registering a first count based on the signed sum of said $V_{OSI}$ and said small positive voltage when said ADC is operating in said first mode, a second counter for registering a second count based on the signed sum of said first and second analog input signals to said ADC, said $V_{OSI}$ and said small positive voltage, and means for forming the difference between said second count and said first count.

19. The system of claim 15, wherein $V_{BE\Phi1}=V_{BE\Phi2}$ when said ADC is operating in said first mode, and said decimator comprises a counter operable when said ADC is operating in said first mode to register a first count based on the signed sum of said $V_{OSI}$ and said added small positive voltage, and operable when said ADC is operating in said second mode to register a second count based on said analog input signals, said $V_{OSI}$ and said added small positive voltage, means for storing said first count, and means for forming the difference between said second count and said first count.

20. The system of claim 10, wherein said source of reference voltage comprises
   first and second diodes, providing respective voltages $V_{BE1}$ and $V_{BE2}$ when stimulated by respective applied currents,
   an operational amplifier (op-amp) having first and second input terminals and an output terminal, said op-amp being characterized by an input offset voltage, $V_{OSI}$,
   a circuit arrangement having first and second modes of operation positioned intermediate said first and second diodes and said op-amp for receiving and applying voltages based on said voltages $V_{BE1}$ and $V_{BE2}$ to said first and second input terminals of said op-amp, said circuit arrangement comprising means operative in said first mode for applying to said op-amp a voltage which nulls said $V_{OSI}$ during operation in said second mode.

21. The system of claim 20, wherein said circuit arrangement comprises a switched network storing said $V_{OSI}$ during said first mode, and said switched capacitor network applying said stored $V_{OSI}$ to substantially cancel said $V_{OSI}$ at said input of said operational amplifier during operation in said second mode.

22. The system of claim 21, further comprising means for alternating between said first and second modes of operation, said first mode of operation becoming the active mode at a time when the cancellation of said $V_{OSI}$ is about to deteriorate to an unacceptable level.

23. The system of claim 21 wherein said means for alternating comprises a logic arrangement responsive to an applied periodic signal, the period of said periodic signal being chosen based on the deterioration of said stored $V_{OSI}$.

24. A temperature measurement method comprising selectively applying M>1 currents $I_j$, j=1,2, ..., M, where each $I_j = I_u + e_j$, $I_u$ being a fixed-valued current and $e_j$ an error current representing a deviation from said $I_u$, to C≧1 sensors, measuring a voltage, $V_{BE}$, at each of said sensors for each said applying of current, and determining a value, $\Delta V_{BE}$, representing the difference between the voltage $V_{BE(TOT)}$ for $V_{BE}$ when the sum of all $I_j$ is selectively applied to each of said sensors and the voltage $V_{BE(AVG)}$ equal to the average for $V_{BE}$ resulting from the application to said each of said sensors of each $I_j$ individually.

25. The method of claim 24, wherein the number of said sensors is C=1, and said selectively applying comprises applying each of said $I_j$ individually in sequence to said sensor and for separately applying all of said $I_j$ to said sensor at the same time.

26. The method of claim 24 further comprising generating a signal proportional to temperature at each of said sensors from the value of $\Delta V_{BE}$ determined for each respective sensor.

27. The method of claim 26 wherein said generating a signal proportional to temperature comprises generating a signal representing $T=[q*\Delta V_{BE}]/[K*\ln(M)]$, where q is the charge of an electron and K is Boltzmann's constant.

* * * * *